US011585738B2

(12) United States Patent
Le Bot et al.

(10) Patent No.: US 11,585,738 B2
(45) Date of Patent: Feb. 21, 2023

(54) APPARATUS FOR TREATING LIQUID TO BE ANALYZED

(71) Applicant: L'Air Liquide, Societe Anonyme pour l'Etude et l'Exploitation des Procedes Georges Claude, Paris (FR)

(72) Inventors: Patrick Le Bot, Vincennes (FR); Frederic Crayssac, Velizy (FR); Benoit Davidian, Saint Maur des Fosses (FR); Mathieu Leclerc, Paris (FR)

(73) Assignee: L'Air Liquide Societe Anonyme Pour L'Etude Et L'Exploitation Des Procedes Georges Claude, Paris (FR)

( * ) Notice: Subject to any disclaimer, the term of this patent is extended or adjusted under 35 U.S.C. 154(b) by 591 days.

(21) Appl. No.: 16/614,905

(22) PCT Filed: May 18, 2018

(86) PCT No.: PCT/FR2018/051207
§ 371 (c)(1),
(2) Date: Nov. 19, 2019

(87) PCT Pub. No.: WO2018/211230
PCT Pub. Date: Nov. 22, 2018

(65) Prior Publication Data
US 2020/0209113 A1 Jul. 2, 2020

(30) Foreign Application Priority Data

May 19, 2017 (FR) ...................................... 1754452
May 19, 2017 (FR) ...................................... 1754453

(51) Int. Cl.
| G01N 1/40 | (2006.01) |
| F17C 13/02 | (2006.01) |
| F25J 3/04 | (2006.01) |
| G01N 1/10 | (2006.01) |
| G01N 1/22 | (2006.01) |
| F17C 13/08 | (2006.01) |

(52) U.S. Cl.
CPC ........... *G01N 1/4022* (2013.01); *F17C 13/02* (2013.01); *F17C 13/086* (2013.01); *F25J 3/0486* (2013.01);
(Continued)

(58) Field of Classification Search
CPC ................... F17C 13/02; F17C 13/086; F17C 2223/0161; F17C 2250/0447; F25J 3/04412; F25J 3/0486; F25J 2280/02; G01N 1/22
See application file for complete search history.

(56) References Cited

U.S. PATENT DOCUMENTS

| 3,123,982 A * | 3/1964 | Brown ................... F17C 13/02 73/864.91 |
| 3,938,391 A | 2/1976 | Winkler |

(Continued)

FOREIGN PATENT DOCUMENTS

| EP | 0 726 434 | 8/1996 |
| FR | 2 797 325 | 2/2001 |

(Continued)

OTHER PUBLICATIONS

International Search Report and Written Report for PCT/FR2018/051207, dated Sep. 17, 2018.
(Continued)

*Primary Examiner* — David Z Huang
*Assistant Examiner* — Jared C. Palmer
(74) *Attorney, Agent, or Firm* — Justin K. Murray

(57) ABSTRACT

An apparatus for analyzing the content of at least one contaminant in a liquid cryogen comprising a cylindrical enclosure, an annular enclosure arranged around the cylindrical enclosure, means for dividing a flow of liquid cryogen in two, means for delivering a first part of the liquid cryogen to the cylindrical enclosure, means for delivering a second part of the liquid cryogen to the annular enclosure, a pipe connected to the cylindrical enclosure to allow vaporized liquid to pass through, a pipe connected to the annular enclosure to allow vaporized liquid to pass through, a heater for heating the cylindrical enclosure vessel and means for stopping the delivery of liquid cryogen to the cylindrical enclosure.

13 Claims, 1 Drawing Sheet

(52) U.S. Cl.
CPC ............ *F25J 3/04412* (2013.01); *G01N 1/10* (2013.01); *G01N 1/22* (2013.01); *F17C 2223/0161* (2013.01); *F17C 2250/0447* (2013.01); *F25J 2280/02* (2013.01); *G01N 2001/2217* (2013.01); *G01N 2001/4027* (2013.01)

(56) References Cited

U.S. PATENT DOCUMENTS

| | | | |
|---|---|---|---|
| 4,991,449 | A | 2/1991 | Dieguez |
| 5,282,927 | A | 2/1994 | Widner |
| 5,567,887 | A | 10/1996 | Schleisman et al. |
| 2015/0033674 | A1* | 2/2015 | Downie .................... F17C 5/06 141/59 |
| 2018/0299195 | A1* | 10/2018 | Degenstein .......... F25J 3/04812 |

FOREIGN PATENT DOCUMENTS

| | | |
|---|---|---|
| FR | 2 839 153 | 10/2003 |
| FR | 2 858 416 | 2/2005 |
| JP | 2004 028819 | 1/2004 |
| WO | WO-9215004 A1 * | 9/1992 ................ F17C 3/12 |

OTHER PUBLICATIONS

International Search Report and Written Report for PCT/FR2018/051206, dated Sep. 7, 2018.

* cited by examiner

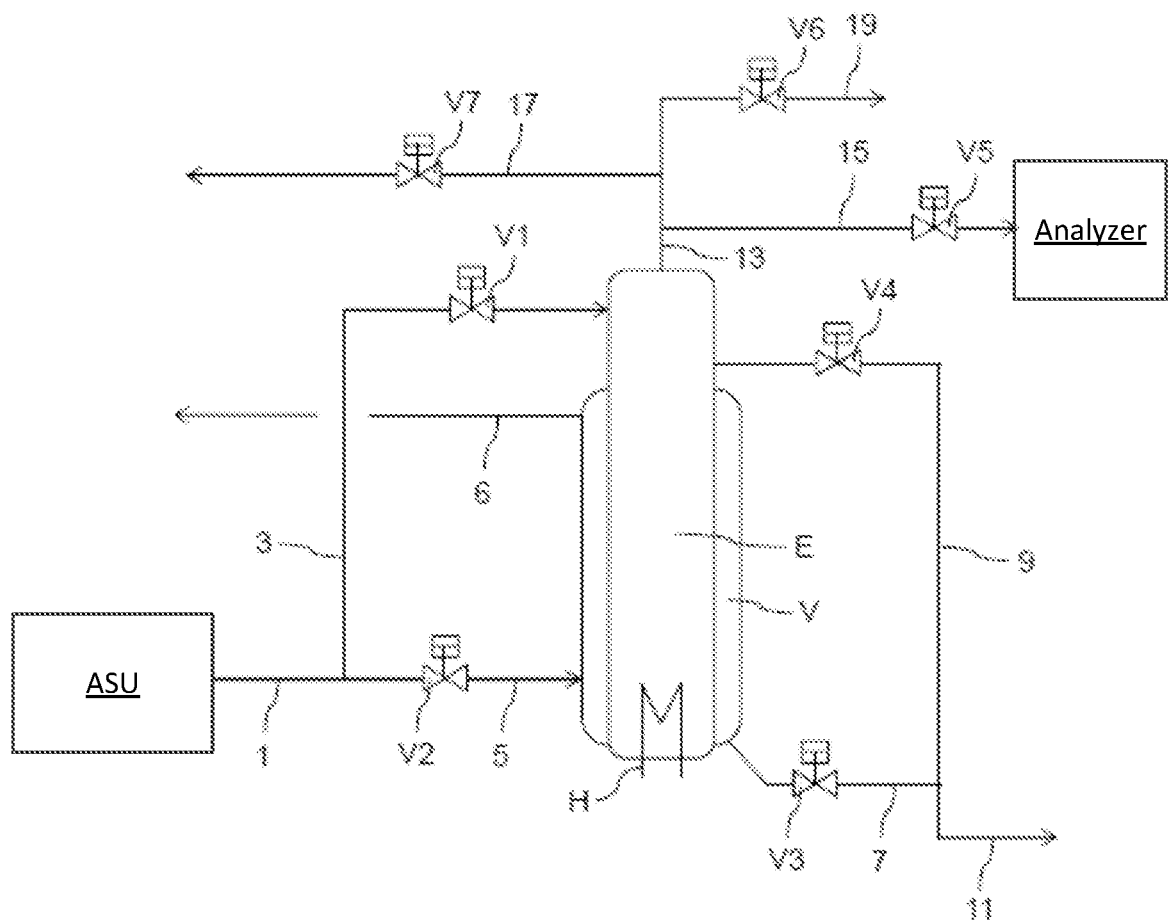

APPARATUS FOR TREATING LIQUID TO BE ANALYZED

CROSS REFERENCE TO RELATED APPLICATIONS

This application is a § 371 of International PCT Application PCT/FR2018/051207, filed May 18, 2018, which claims the benefit of FR1754452 and FR1754453, both filed May 19, 2017, all of which are herein incorporated by reference in their entireties.

TECHNICAL FIELD OF THE INVENTION

The present invention relates to an apparatus for treating analyzer liquid, in particular suitable for being connected to an apparatus for analyzing traces of contaminants of a cryogenic liquid, that is to say a liquid which liquefies at a cryogenic temperature. The oxygen vaporizer of an apparatus for separating air by cryogenic distillation is the location where many impurities, contained in the feed air of the distillation columns, and that have not been able to be eliminated upstream, concentrate. The liquid is preferably a cryogenic liquid containing traces of impurities.

BACKGROUND OF THE INVENTION

Most impurities have a liquid/vapor equilibrium coefficient such that almost all of the impurity is present in the liquid phase, and an infinitesimal part is distributed in the gas phase. The content in the liquid phase therefore increases during the vaporization phases. Furthermore, numerous studies have shown that the higher the content of an impurity in the liquid phase, the more this impurity accumulates in the form of a solid or liquid deposit in the aluminum vaporization matrix. Too high a concentration of impurities is therefore not acceptable because:

Either the impurity reacts directly with oxygen, and can give rise to situations with a high risk of explosion, in particular when the energy released by this reactive impurity is sufficient to start the combustion of the aluminum matrix. This is the case for hydrocarbons. Heavy hydrocarbons (C4+) or hydrocarbons having unsaturated bonds are well known to be stopped upstream of the distillation system by an adsorption process. Light saturated hydrocarbons (C1, C2) are stopped very little or not at all, but have a high solubility in liquid oxygen, which makes the presence of a virtually pure phase of hydrocarbons of this type very unlikely. The hydrocarbon that is well known to be the most critical is propane, taking into account an only partial stoppage in the adsorption systems, and its relatively low solubility in liquid oxygen. Thus, propane entering via the air can accumulate in the liquid oxygen bath until a content greater than its solubility limit is reached and can therefore generate a pure phase in contact with oxygen.

Or the impurity is not reactive, but accelerates the phenomenon of accumulation of all the other impurities, including those which are reactive. This is the case with compounds having a solidification point that is above the operating temperature of liquid oxygen. $CO_2$ and $N_2O$ are the most critical compounds from this point of view because they can, unintentionally or intentionally, not be completely stopped by the adsorption system. Since they are then found in the oxygen, a solid phase is created and may plug the vaporization channels of the exchanger vaporizing the liquid oxygen. It is known that this mechanism, referred to as "dead end boiling" accelerates the concentration of all the impurities contained in the liquid being vaporized, and therefore the risk related to the hydrocarbons and to the combustion of the aluminum matrix is increased.

It is therefore necessary and critical to monitor the content of impurities in the air entering the distillation system and/or the oxygen bath in order to control the acceptable maximum amounts of impurities and to ensure the operating safety of the unit.

However, the degrees of purities to be analyzed are extremely low, given the very low liquid/vapor equilibrium coefficients of the constituents in the oxygen, in particular for $N_2O$ and $CO_2$.

In order to be able to evaluate and control the acceptable maximum amounts of impurities, it is necessary to measure contents of less than 100 ppb, preferentially of from 10 to 50 ppb. However, the measurement frequency may be low.

Current industrial analysis techniques for achieving these detection levels use complex devices and require significant operational expertise.

FR2797325 discloses a method for analyzing a liquid according to the prior art. According to this method, during a main step, a small flow of liquid (oxygen possibly loaded with impurities) continuously enters a chamber and is completely vaporized under a small difference in temperature.

At the same time, the vaporized oxygen is discharged continuously out of the chamber and the impurities are retained in the form of crystals or liquid inside the chamber. It is therefore a complete vaporization of the liquid oxygen in an open circuit.

This step must be long enough (several days continuously) so as to be able to deposit a significant amount of impurities that is sufficient to be able to be detected during the following step (increase to a higher temperature).

The amount of moles of impurities accumulated is determined in a next step by the pressure measurement of the chamber (during the increase in temperature in a closed circuit) and by the calculation of the number of moles in the chamber. The change in the pressure measured in the closed chamber gives the amount of material initially present in the liquid or solid phase; the temperatures at which the pressure changes take place indicate the nature of the substance which vaporizes. In this step, the flow of liquid was previously stopped and the impurities are previously concentrated in a gaseous oxygen atmosphere.

The determination of the nature of the impurities is spurious via this principle, in particular when there are several types of impurities.

Another way that is proposed is to wash the impurities with a solvent in order to perform an analysis. The drawback is the fact of diluting the impurities . . . .

The determination of the nature of the impurities and the quantitative analysis of each impurity deposited is not possible:
  without complete interruption of the various phases,
  without a means of at least partial sampling of these impurities,
  and without a means of analysis outside the proposed system.

One object of the invention is to provide an alternative for measuring contents of impurities in a cryogenic liquid, while using known analyzers that are simple to operate, the detection limit of which remains of the order of 1 ppm.

U.S. Pat. No. 3,123,982 describes an apparatus known in the prior art. The apparatus of '982 is designed to be able to draw off a liquid while avoiding variations in concentrations of the impurity contained. Conversely, embodiments of the present invention seeks to vary it significantly.

In addition, the prior art uses a second liquid vaporization chamber connected between a first liquid vaporization chamber, smaller than the second, and the analyzer.

SUMMARY OF THE INVENTION

One subject of the invention provides for an apparatus for treating liquid to be analyzed, which is in particular suitable for being connected to an analyzer of the content of at least one contaminant in a cryogenic liquid, comprising a cylindrical chamber having a tank, an annular chamber positioned around the cylindrical chamber, means for dividing a flow of cryogenic liquid in two, means for sending a first portion of the cryogenic liquid to the cylindrical chamber, means for sending a second portion of the cryogenic liquid to the annular chamber, an analysis line connected to the cylindrical chamber to allow the passage of vaporized liquid and which is suitable for being connected to the analyzer, a line connected to the annular chamber to allow the passage of vaporized liquid and means for stopping the sending of cryogenic liquid to the cylindrical chamber characterized in that it comprises a heater for heating the tank of the cylindrical chamber.

According to other optional aspects:
the apparatus does not comprise a means of outlet for liquid of the tank of the cylindrical chamber;
the apparatus comprises, as the only means of outlet for liquid of the chamber, an opening in the upper portion of the chamber;
the apparatus comprises an analyzer for measuring the contaminant content of the liquid contained in the cylindrical chamber;
the apparatus comprises an analyzer for measuring the contaminant content in the vaporized liquid originating from the cylindrical chamber;
the analyzer is capable of measuring a concentration of a contaminant of less than 10 ppm, or even 1 ppm, or even 0.1 ppm;
the apparatus as claimed in one of the preceding claims comprises means for closing any fluid inlet and outlet of the cylindrical chamber;
the cylindrical chamber is capable of withstanding pressures below 0.8 bar absolute;
the cylindrical chamber and the annular chamber have a common wall;
the annular chamber surrounds only part of the cylindrical chamber on a fraction of its height from the bottom, the fraction possibly being between ½ and ¾.

According to another aspect of the invention, there is provided an apparatus for separating air by cryogenic distillation, comprising a treatment or analysis apparatus as described in claims 1 to 11 and also means for drawing off a fluid from the apparatus, either in a liquid state or in a gaseous state, and means for sending it in liquid form to the treatment or analysis apparatus, the means comprising, as appropriate, a liquefier of the fluid drawn off in the gaseous state.

The separation apparatus may comprise an adsorption purification unit and a system of columns for distilling a gas purified in the purification unit, the cryogenic liquid being gas drawn off downstream of the purification unit and then liquefied.

The separation apparatus to comprise an adsorption purification unit and a system of columns for distilling a gas purified in the purification unit, the liquid being a bottom liquid from a column of the system or an intermediate liquid from a column of the system.

The cryogenic liquid may be liquefied air, liquid oxygen, liquid nitrogen, liquid methane, liquid carbon monoxide, liquid helium, etc.

According to optional aspects of the present invention:
the apparatus comprises means for sending the entire known amount of liquid L constituting the initial liquid at the pressure P to a chamber, previously brought to a temperature identical to or lower than the vaporization temperature at the pressure P of the liquid to be analyzed, without being vaporized;
the apparatus comprises means for stopping the sending of liquid to the chamber stops;
the apparatus comprises means for filling the chamber is filled with cryogenic liquid, for example liquid oxygen, batchwise;
the apparatus comprises means for partially vaporizing this liquid oxygen cryogenic liquid. The ratio between the initial amount of liquid L and the amount of liquid remaining defines a concentration factor of the liquid phase, if the equilibrium coefficients are very low (for example less than 100). At the same time, the vaporized (gaseous) oxygen is discharged out of the chamber and the impurities are kept inside the chamber;
the contaminants are previously and predominantly concentrated by a known factor in a volume of liquid oxygen;
in the next step, the remainder of concentrated liquid oxygen and the contaminants are vaporized in closed volume in order to be able to carry out the analysis of the impurities;
the volume of liquid available in the chamber and the contents of the vaporized contaminants are sufficient to be directly analyzed via the devices available on the production unit (ASU);
the apparatus comprises means for discharging the impurities from the cylindrical chamber or annular chamber, in particular from the tank of the annular chamber;
the device does not comprise means for discharging the impurities from the tank of the cylindrical chamber;
the means for sending a second portion of the cryogenic liquid to the annular chamber are connected to the tank of the annular chamber;
the apparatus comprises a withdrawal line for withdrawing liquid from the cylindrical chamber preferably provided with a calibrated orifice;
the cylindrical chamber has an upper portion not contained in the annular chamber;
the means for sending a first portion of the cryogenic liquid to the cylindrical chamber and/or the withdrawal line is/are connected to an/the upper portion of the cylindrical chamber;
the apparatus comprises means for discharging the impurities from the cylindrical chamber or annular chamber, in particular from the tank of the annular chamber.

Another subject of the invention is an analysis apparatus comprising an apparatus as claimed in one of claims 1 to 10, and also an analyzer for measuring the contaminant content in the vaporized liquid coming from the cylindrical chamber, the analysis line being directly connected to the analyzer without passing through a second vaporization chamber.

For this, a known amount of liquid is partially vaporized, and it is the very low equilibrium coefficients of the contaminants in the liquid that will allow this concentration. The contaminant remains in the liquid phase as it is evaporated.

Therefore, what could not be measured by a known analyzer because of very (excessively) low contents, will become measurable. The measurement of the content is therefore known not by the pressure variation during an iso-volume reheating, but by a direct analysis of a liquid concentrated by a controlled factor.

According to one variant, the content of at least one contaminant in the concentrated liquid is measured by completely vaporizing the liquid and by significantly superheating the vapor thus formed beyond the vaporization temperature of the impurity to be analyzed, for example to at least 10° C. above the vaporization temperature, to be certain not to have residual traces of liquid that is highly concentrated in contaminants, and by analyzing the content of at least one contaminant in the vaporized phase.

However it is possible to want to measure the content of this concentrated liquid phase by a known sampling technique (for example one of those described in FR2858416 or FR2839153).

The main thing is therefore to have concentrated a known amount of liquid by controlled partial vaporization in order to be able to analyze what could not be analyzed, rather than to deduce the content by monitoring the change in pressure in a closed chamber as described in the prior art.

BRIEF DESCRIPTION OF THE DRAWINGS

The present invention will be clearly understood and its advantages will arise from the description which follows, given merely as a non-limitative example, and with reference to the attached drawings in which:

The FIGURE provides an embodiment of the present invention.

DETAILED DESCRIPTION

The method will be described in more detail with reference to the FIGURE, which illustrates a method and an apparatus according to the invention.

A sample to be analyzed is preferentially drawn off from the liquid oxygen bath from the bottom of the low-pressure column of a double column for separating air by cryogenic distillation. It can be drawn off upstream of the latter, between the various stages of vaporizers of the low-pressure column if this is the case or at the inlet of the vaporizer located at the bottom of the low-pressure column. The sample may also be drawn off at any stage of the unit for producing air gases. It can therefore be drawn off at the outlet of the front end purification (FEP), which serves to strip the air to be distilled of water and of carbon dioxide, to be pre-liquefied before being concentrated.

During step a), a given volume (respectively mass) L of this sample is sent to a vaporization chamber through the lines 1 and 3 and the open valve V1. The volume L is in the chamber E. The line 9 and the valve 4 serve to discharge the excess liquid from the upper portion of the cylindrical chamber E during the filling of the chamber E.

There is a calibrated orifice at the outlet of the chamber E (toward the line 9 and the valve 4).

The flow rate of liquid that can escape therefrom is smaller than the feed flow rate through V1. Therefore, during filling, the chamber is deliberately filled with liquid to a level located above the orifice (and line 9 and valve 4).

Then the feed valve is closed and the excess liquid located above the orifice is discharged by gravity until a liquid level corresponding to the bottom point of the calibrated orifice is obtained.

The advantage of this procedure and of this calibrated orifice is to monitor the amount of liquid introduced into the chamber E and to ensure that this amount of liquid introduced is identical and reproducible at each cycle. This makes it possible to subsequently control (and by also controlling the amount remaining or vaporized) the concentration factor.

Then, according to step b) liquid is no longer sent into the chamber, the valve V1 being closed. During step b) the valve V6 of the line 19 is open and the valves V7 and V5 of the lines 17 and 15 respectively are closed as well as valve V3. The volume L is heated by a heat source H and partially vaporizes, leaving an amount of residual liquid R. A heat exchanger supplied by an external heat source (heat exchange with a heat-generating fluid, electricity, waves, etc.) partially vaporizes the liquid. The vapor generated is discharged from the vaporization chamber through the valve V6 and the lines 13, 19. The vaporization takes place at atmospheric pressure or under vacuum controlled by way of a vacuum-producing system such as a vacuum pump or an ejector.

There are two advantages of a vaporization under vacuum. The first is to lower the vaporization temperature and therefore to further reduce the liquid/vapor equilibrium coefficients. The second is to be able to increase the temperature difference ($\Delta T$) between the heating system and the liquid to be vaporized in order to reduce the vaporization cycle time. The vaporization may also be carried out without the use of a vacuum pump.

In this case, the pressure of the chamber is considered to be equal to the atmospheric pressure, even though it should be slightly higher than this because of the pressure drops.

After a given time, the vaporization chamber is insulated in such a way that the ratio between the volume (respectively mass) of liquid initially introduced and the volume (respectively mass) of liquid present in the vaporization chamber at the time of the insulation is perfectly determined.

This determination can be made by counting the amount of material vaporized, or by counting the energy introduced into the vaporization exchanger by the heat source or else by measuring the variation of the liquid level and/or mass level in the chamber E.

Taking into account the equilibrium coefficient, the impurities will remain at least essentially contained in the liquid phase, and the concentration will have varied by a factor at least essentially equal to the ratio of the initial and final material amounts, in terms of volume or mass. For a more precise evaluation, the amount of impurities discharged into the gas phase can be taken into account in the calculation of the concentration factor and/or in the calculation of the initial concentration. The concentration factor is known by material balance between the initial amount of liquid introduced, and the sum of the amounts vaporized and amounts of residual liquid. The amount of liquid thus vaporized, less than L, is therefore precisely controlled, according to step c), so that the content of contaminant in the residual liquid present in the chamber is substantially equal to that in the initial liquid, multiplied by a predetermined factor.

Then, according to a variant of step i), the contaminant content of the residual liquid is measured directly. A sample of residual liquid is drawn off, and the contaminant content is measured after complete vaporization of the sample of residual liquid; the content of contaminant in the initial liquid is deduced from the measurement of contaminant in the residual liquid.

Or else step ii) makes provision for deducing the contaminant content of the residual liquid by completely vaporizing the residual liquid with the at least one contaminant contained therein, the vaporization chamber E then being insulated from any inlet or outlet of material and then the content of contaminant in the vaporized residual liquid is analyzed.

The contaminant content of the residual liquid is measured by completely vaporizing the residual liquid with at least one contaminant contained therein, the vaporization chamber then being insulated from any inlet or outlet of material, then the content of contaminant in the vaporized residual liquid is analyzed and the content of contaminant in the initial liquid is deduced from the measurement of contaminant in the residual liquid.

The vaporization is therefore continued, according to step ii), until complete vaporization of the residual liquid, the vaporization chamber being thermally insulated in order to have no further exchange of material with the outside of the chamber, then the phase vaporized inside the chamber is superheated until complete vaporization of the deposits of impurities (up to a temperature of −70° C. for example), thus creating a rise in pressure in the vaporization chamber.

It is certain that all the impurities are vaporized if the chamber is brought to a high enough temperature, significantly higher than the vaporization temperature of the impurities at the pressure of the chamber. During this step ii), all the valves allowing an inlet of fluid into the chamber or an outlet of fluid originating from the chamber are closed.

At the end of this complete vaporization, according to step ii), the gas phase is sent in the analysis line 15 of the chamber E to the analyzer through the open valve V5. Since the content of the liquid initially drawn off has been multiplied by the predefined concentration factor during the partial vaporization phase, the content of impurity contained in the vapor at the end of the sequence is therefore high enough to be measured by a conventional analyzer (of NDIR type for example).

After step i) or ii), the chamber will then be cooled back down. This step may be carried out by internal or preferably external circulation of a cryogenic liquid, for example the cryogenic liquid to be analyzed, in order to restart a concentration cycle as defined previously.

The total time of steps a) and b) and c) and d) including one of steps i) or ii) is between 15 min and 40 min, preferably less than 20 minutes.

The apparatus comprises a jacket V which is an annular chamber placed around the chamber E forming a cylindrical space for regulating the temperature of the chamber. The upper part of the chamber E is not contained in the jacket V.

At the end of step i) or ii), it is necessary to cool the chamber via a step e). If the cooling down is carried out simply by sending the liquid to be analyzed into the chamber, the liquid is partially vaporized during this phase and thus the analysis of impurities is distorted. It is therefore necessary to carry out a cooling down by another means. This step will be within the time of between 15 and 40 min.

During step d) of cooling the chamber E, the space V is filled with a liquid at a temperature below the equilibrium temperature of the liquid to be analyzed. In this way, the liquid to be analyzed is sent into the chamber during step a), and the latter remains completely liquid. In the example of the FIGURE, a portion of the liquid to be analyzed is sent via the line 5 and the valve V2 to the space V to cool the chamber E.

As the space V is brought into communication at atmospheric pressure, the filled space is colder than the liquid oxygen originating from the column. Alternatively, the liquid used to cool down the chamber E could be liquid nitrogen, but the system would be more complicated.

Preferably, the liquid contained in the space V is removed during steps b) and c) so that the heat source H only heats the liquid present in the chamber E. The liquid is withdrawn via the line 7 through the valve V3. The line 6 makes it possible to remove the vaporized liquid from the space V.

Compared to the system described in the prior art FR2797325, this double jacket E, V is rendered necessary by the different operating mode of the apparatuses.

The apparatus according to the invention operates by concentration, in the liquid phase, of the impurities. The cycle time is therefore short and it is important to be accurate regarding the amount of impurities deposited. Thus, it is desired to avoid "concentrating" by deposition of impurities that would occur by the "internal" cooling down as described above.

The apparatus of FR2797325 works by cryotrap and accumulation of impurity over a long period. As a result, the amount deposited during the cooling down of the system after heating becomes negligible compared to the amount trapped over the entire accumulation period.

On reading this description, those skilled in the art will understand that the amount of liquid product remaining at the end of the partial vaporization phase will be necessary and sufficient to ensure, during the analysis phase, an amount of material necessary for the purging flow of the analysis line and for a sufficient analysis time to allow an accurate determination of the measurement.

While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims. The present invention may suitably comprise, consist or consist essentially of the elements disclosed and may be practiced in the absence of an element not disclosed. Furthermore, if there is language referring to order, such as first and second, it should be understood in an exemplary sense and not in a limiting sense. For example, it can be recognized by those skilled in the art that certain steps can be combined into a single step.

The singular forms "a", "an" and "the" include plural referents, unless the context clearly dictates otherwise.

"Comprising" in a claim is an open transitional term which means the subsequently identified claim elements are a nonexclusive listing (i.e., anything else may be additionally included and remain within the scope of "comprising"). "Comprising" as used herein may be replaced by the more limited transitional terms "consisting essentially of" and "consisting of" unless otherwise indicated herein.

"Providing" in a claim is defined to mean furnishing, supplying, making available, or preparing something. The step may be performed by any actor in the absence of express language in the claim to the contrary.

Optional or optionally means that the subsequently described event or circumstances may or may not occur. The description includes instances where the event or circumstance occurs and instances where it does not occur.

Ranges may be expressed herein as from about one particular value, and/or to about another particular value. When such a range is expressed, it is to be understood that another embodiment is from the one particular value and/or to the other particular value, along with all combinations within said range.

All references identified herein are each hereby incorporated by reference into this application in their entireties, as well as for the specific information for which each is cited.

The invention claimed is:

1. An apparatus for treating liquid to be analyzed, which is in particular suitable for being connected to an analyzer of the content of at least one contaminant in a cryogenic liquid, apparatus comprising:
    a cylindrical chamber having a tank and a calibrated orifice disposed in an upper portion of the cylindrical chamber;
    an annular chamber positioned around the cylindrical chamber;
    means for dividing a flow of the cryogenic liquid in two;
    means for sending a first portion of the cryogenic liquid to the cylindrical chamber;
    means for sending a second portion of the cryogenic liquid to the annular chamber;
    an analysis line connected to the cylindrical chamber to allow the passage of vaporized liquid and which is suitable for being connected to the analyzer;
    a line connected to the annular chamber to allow the passage of vaporized liquid; and
    means for stopping the sending of cryogenic liquid to the cylindrical chamber;
    a heater configured to heat the tank of the cylindrical chamber;
    an overflow withdrawal line in fluid communication with the calibrated orifice, wherein the overflow withdrawal line is configured to withdraw liquid from the cylindrical enclosure that is disposed above the calibrated orifice,
    wherein the annular chamber surrounds only a fraction of a height of the cylindrical chamber such that the calibrated orifice is not surrounded by the annular chamber.

2. The apparatus as claimed in claim 1, comprising an absence of a means of outlet for liquid in a bottom portion of the tank of the cylindrical chamber.

3. The apparatus as claimed in claim 1, comprising an analyzer for measuring the contaminant content of the liquid contained in the cylindrical chamber.

4. The apparatus as claimed in claim 1, comprising means for closing any fluid inlet and outlet of the cylindrical chamber.

5. The apparatus as claimed in claim 1, wherein the cylindrical chamber and the annular chamber have a common wall.

6. The apparatus as claimed in claim 1, wherein the fraction between ½ and ¾.

7. The apparatus as claimed in claim 1, wherein the cylindrical chamber has an upper portion not contained in the annular chamber.

8. The apparatus as claimed in claim 7, wherein the means for sending a first portion of the cryogenic liquid to the cylindrical chamber is connected to the upper portion of the cylindrical chamber.

9. The apparatus as claimed in claim 1, comprising means for discharging the impurities from the cylindrical chamber or annular chamber, in particular from the tank of the annular chamber.

10. An analysis apparatus comprising an apparatus as claimed in claim 1 and an analyzer configured to measure the contaminant content in the vaporized liquid coming from the cylindrical chamber, wherein the analysis line is directly connected to the analyzer without passing through a second vaporization chamber.

11. An air separation apparatus separate air by cryogenic distillation, the air separation apparatus comprising a treatment apparatus as claimed in claim 1 and also means for drawing off a fluid from the air separation apparatus, either in a liquid state or in a gaseous state, and means for sending the fluid in liquid form to the treatment apparatus, the means for drawing off a fluid from the air separation apparatus comprising, as appropriate, a liquefier of the fluid if drawn off in the gaseous state.

12. The air separation apparatus as claimed in claim 11, further comprising an adsorption purification unit, a system of columns for distilling a gas purified in the purification unit, means for sampling gas downstream of the purification unit, and a means for liquefying the has sampled to form the cryogenic liquid.

13. The air separation apparatus as claimed in claim 11, further comprising an adsorption purification unit, a system of columns for distilling a gas purified in the purification unit, and means for extracting a bottom liquid from the system of columns or an intermediate liquid from the system of columns.

* * * * *